W. V. TURNER.
EMERGENCY AND RELEASE VALVE DEVICE.
APPLICATION FILED SEPT. 20, 1911.
1,057,510.
Patented Apr. 1, 1913.
2 SHEETS—SHEET 1.
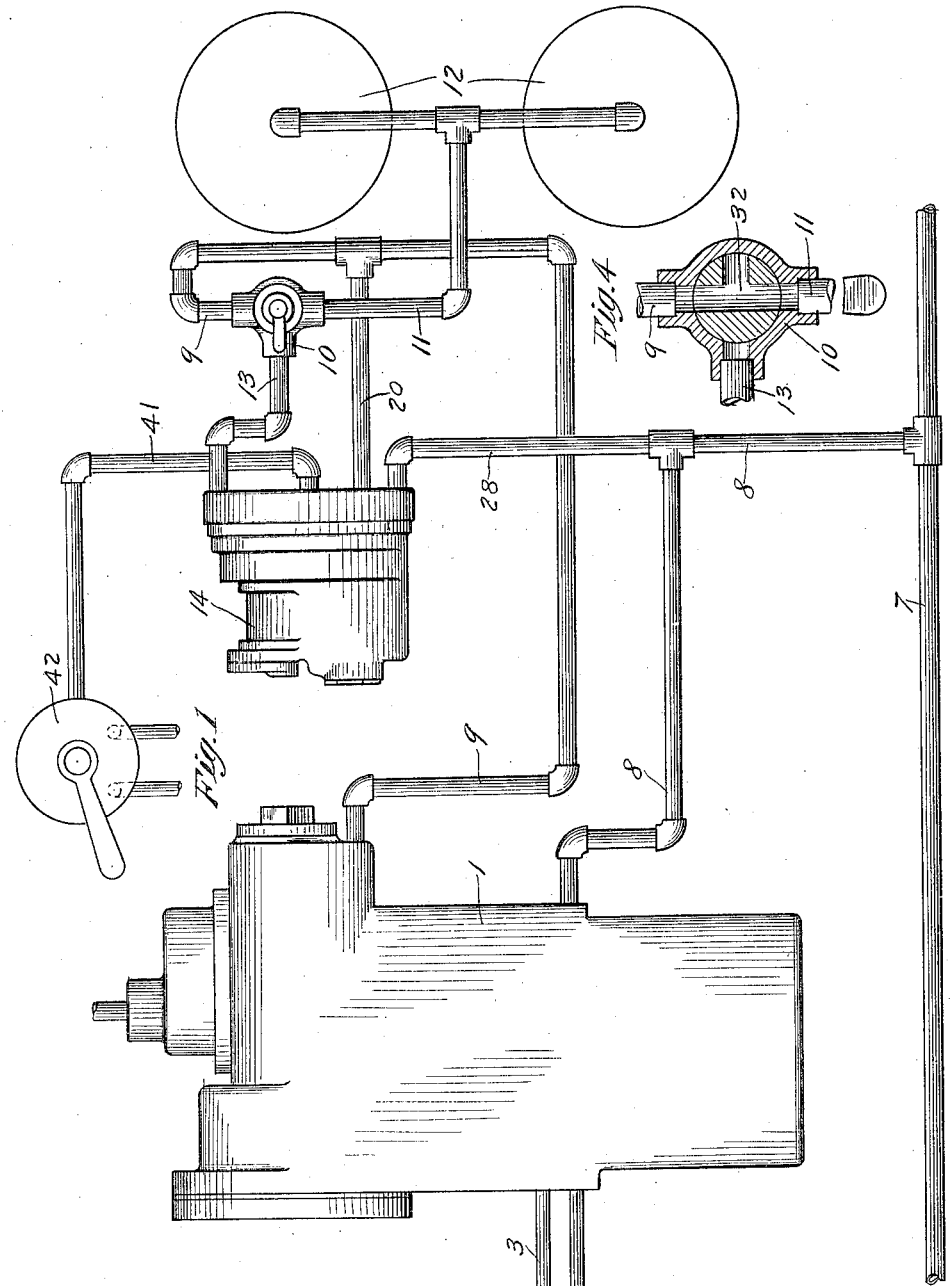
WITNESSES
INVENTOR
Att'y

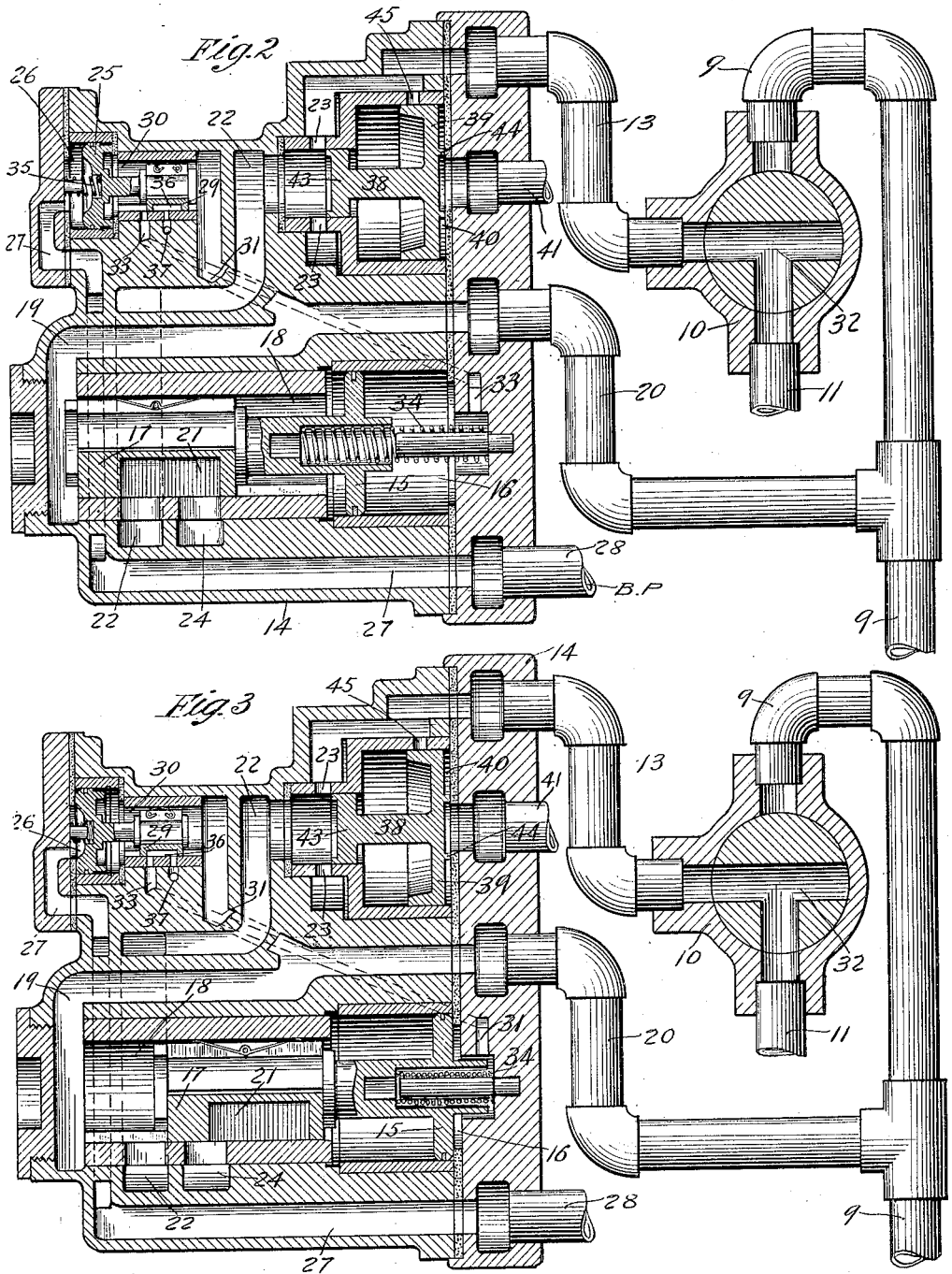

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

EMERGENCY AND RELEASE VALVE DEVICE.

1,057,510.  Specification of Letters Patent.  Patented Apr. 1, 1913.

Application filed September 20, 1911. Serial No. 650,482.

*To all whom it may concern:*

Be it known that I, WALTER V. TURNER, a citizen of the United States, residing at Edgewood, in the county of Allegheny and State of Pennsylvania, have invented new and useful Improvements in Emergency and Release Valve Devices, of which the following is a specification.

This invention relates to fluid pressure brakes, and more particularly to a brake apparatus for controlling the locomotive brakes.

With the more modern types of locomotive brake equipments, such as that described in the Westinghouse Air Brake Company's instruction pamphlet No. 5025, dated October 1906, a high degree of pressure is obtainable both in service and in emergency applications of the brakes and this high braking pressure is sometimes the cause of tires slipping on the engine, in such cases, for example as in operation upon grades with very heavy long trains. It is thus desirable at times to be able to cut out the engine brake and rely upon the train brakes for controlling the train, but in the case of an emergency it is also highly important that an emergency application be obtainable on the engine as well as on the cars of the train.

One object of my invention is to provide means for cutting out the engine brake on the locomotive while retaining the ability to secure an emergency application of the brakes on both the locomotive and the cars of the train.

Another object of my invention is to provide means for securing a quick direct release of the brakes on the engine which is adapted to normally permit the free exhaust of air from the brake cylinder so that leakage into the brake cylinder cannot build up pressure therein, while operating upon an emergency application of the brakes to close the exhaust outlet and thereby permit the usual emergency braking pressure to be secured.

In the accompanying drawings, Figure 1 is a diagrammatic view of an engine brake equipment with my improvements applied thereto; Fig. 2 a central sectional view of the release and emergency controlling valve mechanism, showing the parts in normal release position; Fig. 3 a similar view, showing the parts in emergency application position; and Fig. 4 a detail sectional view of the controlling cock in its open position.

As illustrated in Fig. 1 of the drawings, my invention may be applied in connection with a distributing valve device 1, such as that employed with the well known ET locomotive brake equipment which is described in the above referred to instruction pamphlet. The distributing valve 1 is controlled by an engineer's brake valve 2, connected to the distributing valve by pipe 3, and by an independent brake valve 4 which is connected to the distributing valve by pipe 5 and to the engineer's brake valve by pipe 6. The usual train brake pipe 7 is also connected to the distributing valve by branch pipe 8. The brake cylinder application and release pipe 9 leads from the distributing valve to a cock 10 having one position for connecting the pipe 9 with pipe 11, leading to the engine brake cylinder 12 and another position for connecting the brake cylinder pipe 11 with a pipe 13 leading to the release and emergency valve mechanism 14. The release and emergency valve mechanism 14 may comprise a piston 15 contained in piston chamber 16 and a slide valve 17, contained in valve chamber 18 and adapted to be operated by said piston. The valve chamber 18 is open to passage 19 which is connected to pipe 20, opening into the distributing valve pipe 9. The slide valve 17 has a cavity 21 adapted in the normal position of the valve to connect a passage 22 leading to ports 23 and pipe 13 with an exhaust port 24 and upon movement of the valve to its outer extreme position, the passage 22 is opened to the valve chamber 18. For operating the piston 15, a pilot valve device is provided, comprising a piston 25 contained in piston chamber 26 which is connected by a passage 27 with pipe 28 leading to train pipe branch pipe 8, and a slide valve 29 operated by said piston and contained in valve chamber 30 which is connected by a passage 31 with passage 19.

In operation, if it is desired to cut out the locomotive brake in service applications, the cock 10 is turned to the position shown in Fig. 2, in which the three way cavity 32 therein connects pipe 13 with pipe 11. The pilot valve piston 25 is subject on its outer face to train pipe pressure and on its inner face to the pressure in the distributing valve pipe 9, so that the same is normally maintained in its inner position, in which passage 33, leading to piston chamber 16 is open to valve chamber 30. The valve chamber 30, as well as valve chamber 18, being open to the distributing valve passage 19, it will be seen that both sides of the piston 15 are subject to the same pressure, so that spring 34 maintains the piston 15 and the slide valve 17 in the normal position, shown in Fig. 2.

If a service application of the brakes is made by operating the engineer's brake valve 2 to cause the distributing valve device to supply fluid to pipe 9 in the usual manner, air flows through pipe 20 and passage 19 to valve chamber 18 and also through passage 31 to valve chamber 30 and thence through passage 33 to piston chamber 16. Thus the fluid pressures on opposite sides of the piston 15 remain balanced and the spring 34 holds the piston in release position, so that no air can flow to the brake cylinder past the valve 17. If, however, the train pipe pressure should be reduced below the equalizing point, the pressure in piston chamber 26 falls below the pressure in valve chamber 30 so that the piston 25 is shifted, against the resistance of the light spring 35, to its outer position, as shown in Fig. 3, in which cavity 36 in slide valve 29 connects passage 33 with an exhaust port 37. Air is thereupon vented from piston chamber 16 and the distributing valve pipe pressure in valve chamber 18 then shifts the piston 15 to its outer position, as shown in Fig. 3. Fluid is thus supplied from the distributing valve to the brake cylinder through passage 22, ports 23, pipe 13, cavity 32 in cock 10, and pipe 11. Similarly, upon a sudden reduction in train pipe pressure to effect an emergency application of the brakes, the piston 25 is operated to effect the venting of fluid from piston chamber 16 and the operation of the piston 15. It will thus be seen that with the cock 10 in the closed position, the locomotive brakes are cut out in service but upon an over-reduction in train pipe pressure, or in an emergency application of the brakes, the ports operate to supply fluid to the engine brake cylinders. In releasing the brakes, the train pipe pressure is restored and forces the piston 25 and slide valve 29 to release position, thus permitting the fluid pressures in piston chamber 16 and valve chamber 18 to balance, so that the spring 34 shifts the parts to release position and fluid is released from the engine brake cylinders through ports 23, passage 22, cavity 21, and exhaust port 24.

If it is desired to operate the locomotive brakes in the usual way, the cock 10 is turned to the position shown in Fig. 4, in which cavity 32 connects pipe 9 with pipe 11, and the pipe 13 is disconnected from the brake cylinder pipe 11. Fluid can then be supplied to and released from the engine brake cylinders through pipe 9, cavity 32, and pipe 11 in the usual way, by operation of the distributing valve 1.

A straight air control of the locomotive brakes may be employed in connection with my improvements and for this purpose a double check valve device 38 may be provided, having a large piston head 39 contained in piston chamber 40 which is open to a pipe 41 leading to a straight air brake valve 42 and a small piston head 43 for controlling communication from passage 22 through ports 23 to pipe and passage 13.

Normally, the straight air pipe 41 is open to the atmosphere through an exhaust port in the straight air brake valve 42 and fluid admitted to passage 22, when the release and emergency valve mechanism is operated in an emergency application or on over reduction in train pipe pressure, flows to the face of the small piston head 43. The large head being at atmospheric pressure, the double check valve device 38 is shifted to its outer position, permitting fluid to flow through the ports 23 to pipe and passage 13 and thus supply air to the engine brake cylinders. The large piston is preferably provided with a seat 44, so as to prevent possible leakage of air to the straight air pipe 41.

In order to make a straight air application of the brakes, the brake valve 42 is turned to straight air application position, in which fluid is admitted to the straight air pipe 41. The straight air pressure thus supplied to the large piston head 40 shifts the double check valve device 38 to its inner position, in which the small piston 43 is seated and a port 45 establishes communication from the piston chamber 16 and the straight air pipe 41 to the brake cylinder pipe and passage 13. Air is thus admitted to the engine brake cylinders to effect a straight air application of the brakes. To release the brakes, the straight air brake valve 42 is turned to release position and air is released from the brake cylinder through pipe and passage 13, port 45 and straight air pipe 41. The double check valve device 38 will be held in its inner position until the air is released from the brake cylinder as the face of the small piston head 43 is open to the atmosphere through passage 22, cavity 21, and exhaust port 24.

Having now described my invention, what I claim as new and desire to secure by Letters Patent, is:—

1. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for controlling the passage through which said valve mechanism supplies fluid to the brake cylinder and adapted upon a sudden reduction in train pipe pressure to open said passage.

2. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for normally closing the passage through which said valve mechanism supplies fluid to the brake cylinder and adapted upon a reduction in train pipe pressure below the equalizing point to open said passage and thereby effect an application of the brakes.

3. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for controlling the passage through which fluid is supplied to the brake cylinder and adapted under gradual reductions in train pipe pressure to hold said passage closed and upon a reduction in train pipe pressure below the equalizing point or upon a sudden reduction in train pipe pressure to open said passage.

4. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for controlling the communication through which air is supplied to apply the brakes and operating upon a sudden reduction in train pipe pressure for opening said communication.

5. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for closing the communication through which air is supplied to apply the brakes upon a gradual reduction in train pipe pressure and operating upon a sudden reduction in train pipe pressure for opening said communication.

6. In a fluid pressure brake, the combination with a train pipe, of a valve mechanism for effecting a service application of the brakes upon a gradual reduction in train pipe pressure and an emergency application of the brakes upon a sudden reduction in train pipe pressure, of a valve device for closing the communication through which air is supplied to apply the brakes under gradual reductions in train pipe pressure and operating upon a reduction in train pipe pressure below equalizing point or upon a sudden reduction in train pipe pressure for opening said communication.

7. In a fluid pressure brake, the combination with a train pipe, brake cylinder, and valve means for effecting an application of the brakes upon a reduction in train pipe pressure, of a valve device for controlling the communication for supplying air from said valve means to the brake cylinder and adapted under gradual reductions in train pipe pressure to close said communication and upon a reduction in train pipe pressure below the equalizing point or upon a sudden reduction in train pipe pressure to open said communication.

8. In a fluid pressure brake, the combination with a train pipe, of valve means operating upon a reduction in train pipe pressure for effecting an application of the brakes, a valve device for cutting said valve means out of action under gradual reductions in train pipe pressure and adapted to cut said valve means into action upon a reduction in train pipe pressure below the equalizing point or upon a sudden reduction in train pipe pressure, and a cock controlling passages for cutting said valve device into and out of action.

9. In a fluid pressure brake, the combination with a train pipe, of valve means operating upon a reduction in train pipe pressure for effecting an application of the brakes, a valve device for cutting said valve means out of action under gradual reductions in train pipe pressure and adapted to cut said valve means into action upon a reduction in train pipe pressure below the equalizing point or upon a sudden reduction in train pipe pressure, and a manually operated cock having one position for cutting said valve device into operation and another position for connecting said valve means to control the application of the brakes independently of said valve device.

10. In a fluid pressure brake, the combination with a train pipe, of valve means operated by a reduction in train pipe pressure for effecting an application of the brakes, a valve device for controlling communication for supplying air from said valve means to the brake cylinder, a pilot valve mechanism operating upon a sudden reduction in train pipe pressure for actuating said valve device to open said communication, and a manually operated cock having one position for connecting said valve means to said valve device and another position for connecting said valve means directly to the brake cylinder.

11. In a fluid pressure brake, the combination with a train pipe, of valve means operated by a reduction in train pipe pressure for effecting an application of the brakes, a valve mechanism adapted to cut said valve means out of action under gradual reductions in train pipe pressure and operating upon a sudden reduction in train pipe pressure to cut said valve means into action, a straight air brake valve, and means for supplying and releasing air to and from the brake cylinder by operation of the straight air brake valve when said valve means is cut out.

12. In a fluid pressure brake, the combination with a train pipe, of valve means operated by a reduction in train pipe pressure for effecting an application of the brakes, a valve mechanism adapted to cut said valve means out of action under gradual reductions in train pipe pressure and operating upon a sudden reduction in train pipe pressure to cut said valve means into action, a straight air brake valve, and a double check valve for opening communication for supplying air to the brake cylinder by operation of said straight air brake valve when said valve device is in position for cutting out said valve means.

13. In a fluid pressure brake, the combination with a train pipe, brake cylinder, and valve means operating upon a reduction in train pipe pressure for supplying fluid to the brake cylinder, of a valve device having a valve for controlling communication from said valve means to the brake cylinder and a piston normally subject on opposite sides to fluid supplied by said valve means and a pilot valve device subject on one side to the same pressure and on the opposite side to train pipe pressure for venting air from one side of said piston upon a sudden reduction in train pipe pressure or a reduction in train pipe pressure below the equalizing point, to thereby operate said valve device to open communication from said valve means to the brake cylinder.

14. In a fluid pressure brake, the combination with a train pipe, brake cylinder, and valve means operating upon a reduction in train pipe pressure for applying the brakes, of a valve mechanism for cutting off communication for supplying fluid from the valve means to the brake cylinder under gradual reductions in train pipe pressure and adapted upon a sudden reduction in train pipe pressure to open said communication, said valve mechanism having means for normally maintaining an open exhaust to the brake cylinder and operating upon opening said communication to close the exhaust port.

15. The combination with a train pipe and means for effecting a service application of the brakes upon a reduction in train pipe pressure, of a valve mechanism for cutting said means out of action under gradual reductions in train pipe pressure and for maintaining an open exhaust port to the brake cylinder and adapted upon a sudden reduction or a reduction in train pipe pressure below the equalizing point to cut said means into action to cause an application of the brakes and close the exhaust port.

16. In a fluid pressure brake, the combination with a train pipe, brake cylinder, and an automatic valve device operating upon a reduction in train pipe pressure to effect an application of the brakes, of a valve mechanism having an exhaust port and adapted under gradual reductions in train pipe pressure to open said exhaust port to the brake cylinder and close communication through which fluid is supplied from said automatic valve device to the brake cylinder and provided with means operating upon a sudden reduction in train pipe pressure below the equalizing point for opening said communication to the brake cylinder and closing said exhaust port.

In testimony whereof I have hereunto set my hand.

WALTER V. TURNER.

Witnesses:
 WM. M. CADY,
 T. L. RAFTERY.

---

Copies of this patent may be obtained for five cents each, by addressing the "Commissioner of Patents, Washington, D. C."